(12) United States Patent
Lee et al.

(10) Patent No.: US 6,352,798 B1
(45) Date of Patent: Mar. 5, 2002

(54) PHENYL BORON-BASED COMPOUNDS AS ANION RECEPTORS FOR NON-AQUEOUS BATTERY ELECTROLYTES

(75) Inventors: Hung Sui Lee, East Setauket; Xiao-Qing Yang, Port Jefferson Station; James McBreen, Bellport; Xuehui Sun, Middle Island, all of NY (US)

(73) Assignee: Brookhaven Science Associates, LLC, Upton, NY (US)

(*) Notice: Subject to any disclaimer, the term of this patent is extended or adjusted under 35 U.S.C. 154(b) by 0 days.

(21) Appl. No.: 09/492,569

(22) Filed: Jan. 27, 2000

Related U.S. Application Data

(63) Continuation-in-part of application No. 08/986,846, filed on Dec. 8, 1997, now Pat. No. 6,022,643.
(51) Int. Cl.[7] ................................................ H01M 6/14
(52) U.S. Cl. ........................ 429/324; 429/303; 429/307; 558/293; 558/294
(58) Field of Search ................................ 429/324, 303, 429/307; 558/293, 294

(56) References Cited

FOREIGN PATENT DOCUMENTS

| DE | 4014488 A | * 11/1991 | ............. C07F/5/02 |
| JP | 05 148259 A | * 6/1993 | ......... C07D/319/06 |

OTHER PUBLICATIONS

Conroy et al., "A Series of 1,3–Dioxolanes . . . ", Inorganic Chemistry, vol.9, No. 12, pp. 2739–2743, 1970, (no month available).*

* cited by examiner

Primary Examiner—Carol Chaney
(74) Attorney, Agent, or Firm—Margaret C. Bogosian

(57) ABSTRACT

Novel fluorinated boronate-based compounds which act as anion receptors in non-aqueous battery electrolytes are provided. When added to non-aqueous battery electrolytes, the fluorinated boronate-based compounds of the invention enhance ionic conductivity and cation transference number of non-aqueous electrolytes. The fluorinated boronate-based anion receptors include different fluorinated alkyl and aryl groups.

39 Claims, 3 Drawing Sheets

Electrochemical Stability of Boronate-Based Anion Receptors

9 $(C_6F_{12})O_2B(C_6H_5)$   10 $(C_6F_{12})O_2B(C_6H_3F_2)$   11 $(C_6F_{12})O_2B(C_6F_5)$

12 $(C_3HF_6O)_2B(C_6H_5)$   13 $(C_3HF_6O)_2B(C_6H_3F_2)$   14 $(C_3HF_6O)_2B(C_6F_5)$   15 $(C_6F_5O)_2B(C_6F_5)$

Chemical Structures of Boronate-Based Anion Receptors

Electrochemical Stability of Boronate-Based Anion Receptors

PHENYL BORON-BASED COMPOUNDS AS ANION RECEPTORS FOR NON-AQUEOUS BATTERY ELECTROLYTES

RELATED APPLICATION

The present application is a continuation-in-part application of application Ser. No. 08/986,846, filed on Dec. 8, 1997 now U.S. Pat. No. 6,022,643 in the name of Lee et al. and titled BORON COMPOUNDS AS ANION BINDING AGENTS FOR NONAQUEOUS BATTERY ELECTROLYTES. This application is incorporated by reference herein in its entirety.

GOVERNMENT RIGHTS IN THE INVENTION

This invention was made with Government support under Contract No. DE-AC02-98CH10886, between the U.S. Department of Energy and Brookhaven Science Associates. The Government has certain rights in the invention.

BACKGROUND OF THE INVENTION

This invention relates to the design, synthesis and application of novel fluorinated boron based compounds which act as anion receptors in non-aqueous battery electrolytes. As a result, the anion receptors of the present invention can be used as additives to enhance the ionic conductivity and cation transference number of non-aqueous electrolytes. More specifically, the family of anion receptors of the present invention includes phenyl boronate, fluorinate phenyl boronate, and fluorinated alkyl substituted phenyl boronate based compounds bearing different fluorinated alkyl and aryl groups.

In the past, research has been conducted on the reduction of ion pairing in non-aqueous electrolytes. The design and synthesis of receptor molecules for the selective complexation of ions has been an active area of research in the last two decades. With respect to lithium batteries, ion pairing accounts for the low lithium transference in non-aqueous electrolytes. To decrease ion pairing, researchers have used either solvents of high dielectric constant or added a neutral ligand to coordinate either the cation or the anion. Coordination with either the cation or anion was expected to increase the cation-anion distance of closest approach and thus decrease ion pair formation. For cation coordination in liquid non-aqueous electrolytes, Salomon [1] has reported the use of crown ether 18-crown-6, Matsuda, et al. [2], the use of 12-crown-4, and Schriever, et al. [3], have used cryptands to decrease ion pair formation in polymer electrolytes.

More recently, research has focused on providing neutral compounds to complex anions. These compounds were summarized in a review article written by F. P. Schmidtchen and M. Berger [4]. However, because anion complexation occurs through hydrogen bonding, these neutral compounds cannot be used in lithium batteries. Lee, et al. have utilized aza-ether based compounds as anion receptor molecules. Electron withdrawing groups were used to substitute amine hydrogen atoms in linear aza-ethers, multi-branched aza-ethers, and cyclic aza-crown ethers [5].

U.S. Pat. No. 5,849,432 to Angell et al. discloses liquid boron-containing electrolyte solvents and liquid boron-containing electrolyte solutions, wherein the backbones of the boron compounds have either an $O_3B$ or $O_2B$-X structure, where X is limited to a halogen atom. However, Angell et al. do not disclose boron compounds wherein the backbone structure is $O_2BR$, where R is a phenyl group.

Anion coordination is much more important than cation coordination in lithium battery electrolytes because it offers the ability of increasing both conductivity and lithium transference number. Accordingly, there is still a need in the art of lithium batteries for electrolyte additives which can complex anions, yet are stable in lithium batteries. There is also a need in the art of lithium batteries to enhance the conductivity of inexpensive and environmentally friendly inorganic salts such as LiF, LiCl, LiBr and LiI. In addition, there is a need to increase the transference number of the $Li^+$ ion. In many non-aqueous electrolytes, in particular polymer electrolytes, the transference number of the $Li^+$ ion is low. This introduces additional polarization losses in batteries and reduces the utilization of the cathode material.

It is therefore, an object of the present invention to provide a new family of compounds which enhances the conductivity of lithium battery electrolytes by complexing with the anion moiety of the salt, and also increases the transference number of the $Li^+$ ion in electrolytes.

Another object of the present invention is to increase the conductivity of cost effective electrolyte salts such as LiF, LiCl, LiBr and LiI.

Another object of the present invention is to provide improved electrochemical cells by use of electrolyte additives.

SUMMARY OF THE INVENTION

The present invention, which addresses the needs of the prior art, provides novel fluorinated boron-based compounds which act as anion receptors in non-aqueous battery electrolytes. When added to non-aqueous electrolytes, the receptors of the present invention complex the anion moiety of the electrolyte salt, thereby increasing the conductivity of the electrolytes and the transference number of $Li^+$ ion in electrolytes. The present invention also relates to the use of fluorinated boron-based anion receptors as electrolyte additives for both primary and secondary lithium batteries. Electrolytes used for the electrochemical cells of the present invention include liquid electrolytes using organic solvents, polymer electrolytes, and gel electrolytes.

As a result of the present invention, stable anion receptor compounds are provided which increase dramatically the conductivity of electrolytes for lithium batteries. The electrolyte conductivity is increased because the fluorinated boron-based compounds of the present invention complex anion moieties in non-aqueous electrolytes thereby increasing the concentration of lithium cations available for transport. As a result of using the anion receptors of the present invention, lithium batteries are provided which have significantly increased rate capability or discharge current density. The enhanced batteries of the present invention also have increased cathode utilization because of the increased $Li^+$ ion transference number.

The anion receptors of the present invention include a boron-based compound of the formula $QO_2BR$ or $(QO)_2BR$, wherein R is a phenyl, a fluorinated phenyl, or a fluorinated alkyl substituted phenyl and Q is a fluorine bearing moiety. R is selected from the group consisting of $C_6H_5$, $C_6H_4F$, $C_6H_3F_2$, $C_6H_2F_3$, $C_6HF_4$, $C_6F_5$, $C_6H_4CF_3$, and $C_6H_3(CF_3)_2$ and Q is selected from the group consisting of —$C_6H_3F$—, —$C_6H_2F_2$—, —$C_6HF_3$—, —$C_6F_4$—, —$((CF_3)_2C)_2$—, —$C_6F_5$, and —$(CF_3)_2CH$.

A preferred embodiment of the present invention is an electrochemical cell which includes a non-aqueous electrolyte solvent and an electrolyte additive that includes a boron-based anion receptor, wherein said boron-based anion receptor is a compound having the formula QO$_2$BR or (QO)$_2$BR, wherein R is a phenyl, a fluorinated phenyl, or a fluorinated alkyl substituted phenyl and Q is a fluorine bearing moiety. R is selected from the group consisting of C$_6$H$_5$, C$_6$H$_4$F, C$_6$H$_3$F$_2$, C$_6$H$_2$F$_3$, C$_6$HF$_4$, C$_6$F$_5$, C$_6$H$_4$CF$_3$, and C$_6$H$_3$(CF$_3$)$_2$ and Q is selected from the group consisting of —C$_6$H$_3$F—, —C$_6$H$_2$F$_2$—, —C$_6$HF$_3$—, —C$_6$F$_4$—, —((CF$_3$)$_2$C)$_2$—, —C$_6$F$_5$, and —(CF$_3$)$_2$CH. The non-aqueous electrolyte solvent for the electrochemical cell is selected from the group consisting of tetrahydrofuran, 2-methyl furan, 4-methyldioxolane, 1,3-dioxolane, 1,2-dimethoxyethane, dimethoxymethane, ethylene carbonate, propylene carbonate, γ-butyrolactone, methyl formate, sulfolane, acetonitrile and 3-methyl-2-oxazolidinone, dimethyl carbonate, dimethyl ether, 1-methyl-2-pyrrolidinone and poly(ethylene oxide). In one embodiment, the non-aqueous electrolyte solvent is a gel electrolyte selected from the group consisting of poly(acrylo nitrile) and poly(vinylidene flouride-hexafluoro propylene).

The electrochemical cell can include a lithium salt in a liquid organic solvent wherein the lithium salt is selected from the group consisting of LiF, LiCl, LiBr, LiI, CF$_3$COOLi, C$_2$F$_5$COOLi, C$_6$F$_5$COOLi and mixtures thereof. In a preferred embodiment, the liquid organic solvent is a compound selected from the group consisting of ethylene carbonate, propylene carbonate, dimethyl carbonate, dimethyl ether, γ-butyrolactone, 3-methyl-2-oxazolidinone, 1-methyl-2-pyrrolidinone and mixtures thereof.

In another embodiment, the electrochemical cell includes an electrolyte solute selected from the group consisting of LiF, LiCl, LiBr, LiI, CF$_3$COOLi, C$_2$F$_5$COOLi, and mixtures thereof.

A preferred embodiment of the electrochemical cell includes an anode selected from the group consisting of lithium, lithium alloys, lithium carbon intercalation compounds, lithium graphite intercalation compounds, lithium metal oxide intercalation compounds, and mixtures thereof. The electrochemical cell can also include a cathode selected from the group consisting of a transition metal oxide, a transition metal chalcogenide, a poly(carbon disulfide) polymer, an organo-disulfide redox polymer, a polyaniline, an organo-disulfide/polyaniline composite and an oxychloride. The transition metal oxide is selected from the group consisting of Li$_{2.5}$V$_6$O$_{13}$, Li$_{1.2}$V$_2$O$_5$, LiCoO$_2$, LiNiO$_2$, LiMn$_2$O$_4$, LiMnO$_2$, LiNi$_{1-x}$M$_x$O$_2$, (M=Co, Mg, Al, and Ti); the transition metal chalcogenide is selected from the group consisting of Li$_3$NbSe$_3$, LiTiS$_2$ and LiMoS$_2$; the organo-disulfide/polyaniline composite is a mixture of polyaniline and 2,5 dimercapto-1,3,4-thiadiazole; and the organo-disulfide redox polymers are formed by reversible electrochemical dimerization/scission or polymerization/depolymerization of organo disulfide polymers by the reaction:

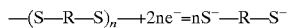

wherein R is an aliphatic or aromatic entity and n>50.

A preferred embodiment of the present invention is a method of enhancing the conductivity of a non-aqueous battery electrolyte which includes adding to said electrolyte a conductivity enhancing amount of a fluorinated boron-based anion receptor. Preferably, the anion receptor is selected from the group consisting of C$_6$H$_5$, C$_6$H$_4$F, C$_6$H$_3$F$_2$, C$_6$H$_2$F$_3$, C$_6$HF$_4$, C$_6$F$_5$, C$_6$H$_4$CF$_3$, C$_6$H$_3$(CF$_3$)$_2$, —C$_6$H$_3$F—, —C$_6$H$_2$F$_2$—, —C$_6$HF$_3$—, —C$_6$F$_4$—, —((CF$_3$)$_2$C)$_2$—, —C$_6$F$_5$, and —(CF$_3$)$_2$CH. In a preferred embodiment, the method also includes adding to the electrolyte an electrolyte solute selected from the group consisting of LiClO$_4$, LiAsF$_6$, LiBF$_4$, LiPF$_6$ and LiSbF$_6$. In another embodiment, an electrolyte solute selected from the group consisting of LiF, LiCl, LiBr, LiI, CF$_3$COOLi, C$_2$F$_5$COOLi, and mixtures thereof is added to the electrolyte.

Another embodiment of the present invention provides a non-aqueous battery electrolyte which includes a solvent; a lithium salt; and an additive that includes an anion receptor having a boron-based compound of the formula QO$_2$BR or (QO)$_2$BR, wherein R is a phenyl, a fluorinated phenyl, or a fluorinated alkyl substituted phenyl and Q is a fluorine bearing moiety. R is selected from the group consisting of C$_6$H$_5$, C$_6$H$_4$F, C$_6$H$_3$F$_2$, C$_6$H$_2$F$_3$, C$_6$HF$_4$, C$_6$F$_5$, C$_6$H$_4$CF$_3$, and C$_6$H$_3$(CF$_3$)$_2$ and Q is selected from the group consisting of —C$_6$H$_3$F—, —C$_6$H$_2$F$_2$—, —C$_6$HF$_3$—, —C$_6$F$_4$—, —((CF$_3$)$_2$C)$_2$—, —C$_6$F$_5$, and —(CF$_3$)$_2$CH. In a preferred embodiment, the solvent is selected from the group consisting of tetrahydrofuran, 2-methyl furan, 4-methyldioxolane, 1,3-dioxolane, 1,2-dimethoxyethane, dimethoxymethane, ethylene carbonate (hereinafter "EC"), propylene carbonate, sulfolane, γ-butyrolactone, methyl formate, acetonitrile and 3-methyl-2-oxazolidinone, dimethyl carbonate (hereinafter "DMC"), dimethyl ether (hereinafter "DME"), 1-methyl-2-pyrrolidinone and mixtures thereof and poly(ethylene oxide). In one embodiment, the solvent is a gel electrolyte selected from the group consisting of poly(acrylo nitrile) and poly(vinylidene flouride-hexafluoro propylene). The lithium salt for the non-aqueous battery electrolyte is selected from the group consisting of LiF, LiCl, LiBr, LiI, CF$_3$COOLi, C$_2$F$_5$COOLi, C$_6$F$_5$COOLi and mixtures thereof.

Another embodiment of the present invention is a non-aqueous battery electrolyte additive which includes an anion receptor having a boron-based compound of the formula QO$_2$BR or (QO)$_2$BR, wherein R is a phenyl, a fluorinated phenyl, or a fluorinated alkyl substituted phenyl and Q is a fluorine bearing moiety. R is selected from the group consisting of C$_6$H$_5$, C$_6$H$_4$F, C$_6$H$_3$F$_2$, C$_6$H$_2$F$_3$, C$_6$HF$_4$, C$_6$F$_5$, C$_6$H$_4$CF$_3$, C$_6$H$_3$(CF$_3$)$_2$ and Q is selected from the group consisting of —C$_6$H$_3$F—, —C$_6$H$_2$F$_2$—, —C$_6$HF$_3$—, —C$_6$F$_4$—, —((CF$_3$)$_2$—, —C$_6$F$_5$, and —(CF$_3$)$_2$CH. In one embodiment, the non-aqueous battery electrolyte additive can also include an electrolyte solute selected from the group consisting of LiClO$_4$, LiAsF$_6$, LiBF$_4$, LiPF$_6$ and LiSbF$_6$. In another embodiment, the non-aqueous battery electrolyte additive can include a lithium salt selected from the group consisting of LiF, LiCl, LiBr, LiI, CF$_3$COOLi, C$_2$F$_5$COOLi, and mixtures thereof.

When added to liquid, non-aqueous electrolytes containing salts such as LiF, LiCl, LiBr or LiI, CF$_3$COOLi, and C$_2$F$_5$COOLi, the fluorinated boron-based compounds of the present invention provide a salting-in effect which results in increased solubility and electrolyte conductivity. Thus, another important advantage of using the boron-based compounds of the present invention is the significant cost savings resulting from using low cost electrolyte salts such as LiF, LiCl, LiBr and LiI.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

DETAILED DESCRIPTION OF THE INVENTION

Figure 1A:
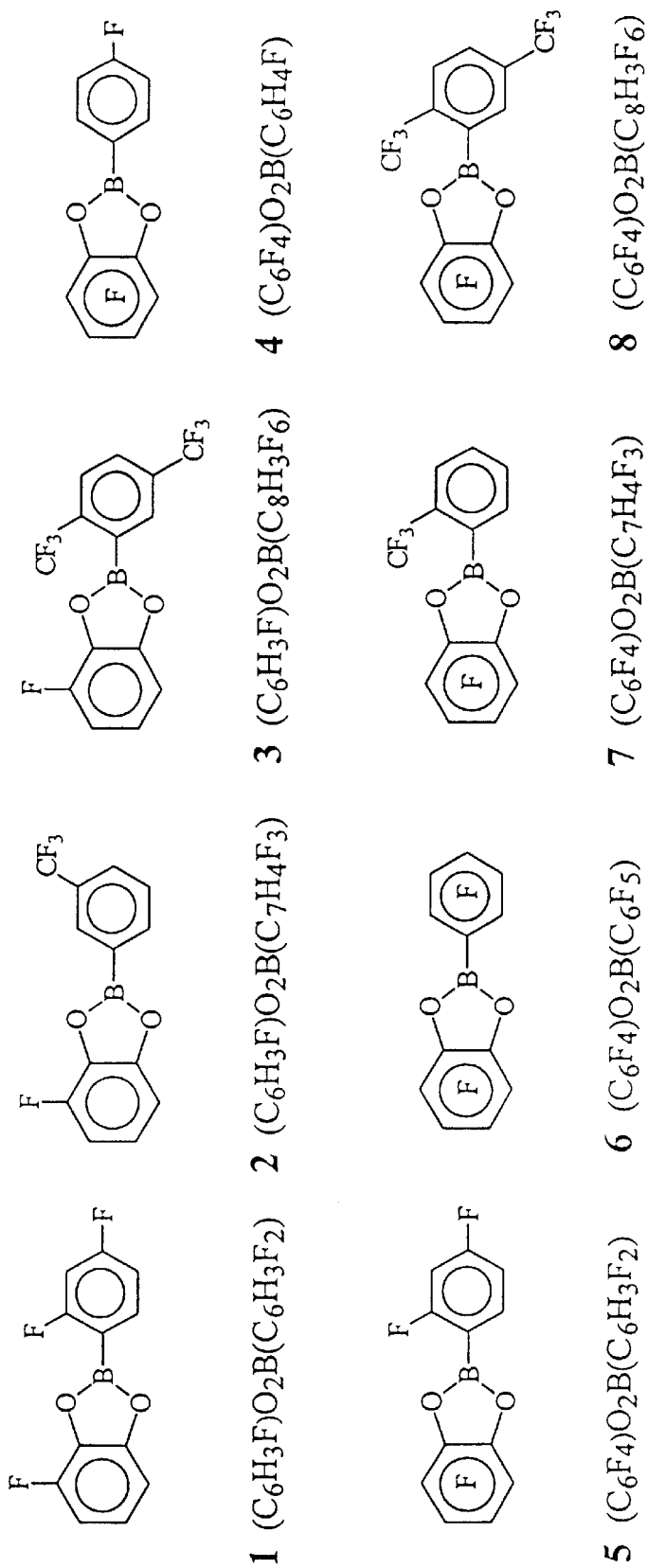
FIG. 1 illustrates the chemical structure of phenyl boronate based anion receptors. The numbers under each formula correspond to the compound number used in the detailed description and examples herein.
Figure 1B:
Figure 1B:
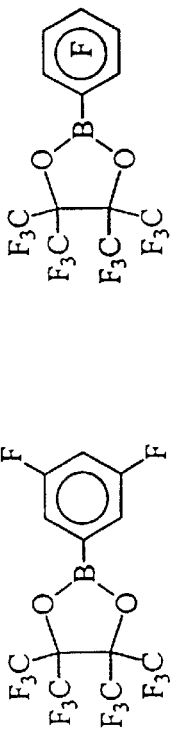
Figure 1B:
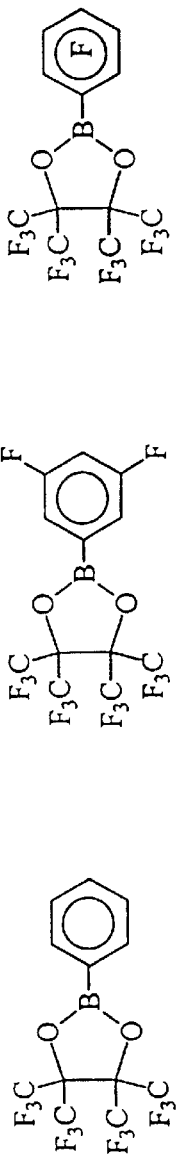
Figure 1B:
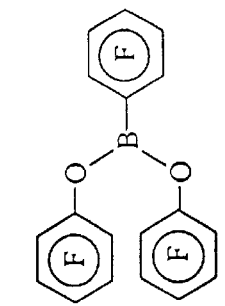
Figure 1B:
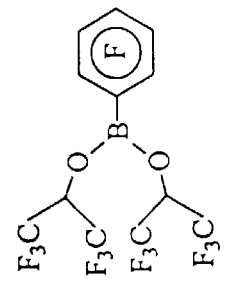
Figure 1B:
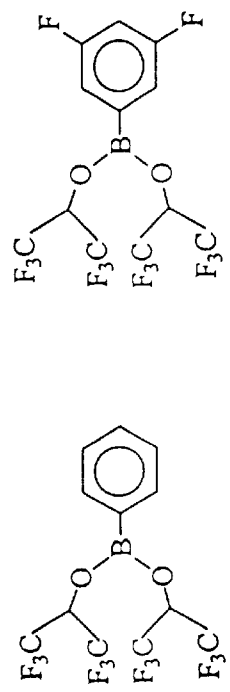

The present invention provides novel anion receptors and methods for their preparation. As used in the present invention, anion receptor means a compound which binds anions thereby moving the ionization equilibrium point of electrolyte salts towards increasing the availability of cation moieties.

The present invention also provides methods of use for the novel anion receptors as additives to enhance the conductivity of electrolyte in electrochemical cells. More specifically, the present invention provides a family of anion receptors which include boron-based compounds of the formula $Q_3B$. Q is a fluorine bearing moiety selected from the group consisting of $CF_3CH_2O$, $C_3F_7CH_2O$, $(CF_3)_2CHO$, $(CF_3)_2C(C_6H_5)O$, $(CF_3)_3CO$, $FC_6H_4O$, $F_2C_6H_3O$, $F_4C_6HO$, $C_6F_5O$, $CF_3C_6H_4O$, $(CF_3)_2C_6H_3O$ and $C_6F_5$. FIG. 1 illustrates the structures and nomenclature of the anion receptor compounds of the present invention.

In a preferred embodiment, the present invention provides a family of anion receptors which include a boronate-based compound. For the purposes of the present invention, a boronate-based compound is defined as a compound having a backbone structure of boron bonding represented by the formula $QO_2BR$ or $(QO)_2BR$. In the most preferred embodiment, R is phenyl, fluorinated phenyl, or fluorinated alkyl substituted phenyl selected from the group consisting of $C_6H_5$, $C_6H_4F$, $C_6H_3F_2$, $C_6H_2F_3$, $C_6HF_4$, $C_6F_5$, $C_6H_4CF_3$, and $C_6H_3(CF_3)_2$. For 1, 3, 2-dioxaborolane based compounds, Q may be fluorinated phenylene or fluorinated alkyl substituted phenylene selected from the group consisting of —$C_6H_3F$—, —$C_6H_2F_2$—, —$C_6HF_3$—, —$C_6F_4$—. For 1, 3, 2-dioxaborole based compounds, Q may be fluorinated alkyl substituted ethylene —$((CF_3)_2C)_2$—. Another embodiment of the present invention includes boronate-based compounds with the general formula $(QO)_2BR$, wherein Q is fluorinated alkyl or aryl rings, such as $(CF_3)_2CH$— and $C_6F_5$—. FIG. 1 illustrates the structures and nomenclatures of preferred anion receptor compounds of the present invention.

It has been discovered that when the fluorinated boron-based compounds of the present invention are added to electrolytes utilized in either primary or secondary lithium batteries, the ionic conductivity is dramatically increased. Near Edge X-ray Absorption Fine Structure (NEXAFS) spectroscopy studies have shown that anions of lithium salts found in many electrolytes form complexes with boron atoms bearing electron withdrawing groups.

Without being bound by any theory, it is believed that the fluorinated alkyl and aryl borate, fluorinated boronate, and borane compounds of the present invention increase electrolyte conductivity by complexing the anion moieties of electrolyte salts. One of the preferred groups of fluorinated boronate compounds of the present invention has an $O_2BR$ structure which provides increased chemical and electrochemical stability. For this group of fluorinated bomate compounds, R is phenyl, fluorinated phenyl, or fluorinated alkyl substituted phenyl. The most preferred fluorinated bomate compounds are phenyl boronate, fluorinate phenyl boronate, and fluorinated alkyl substituted phenyl boronate-based compounds bearing different fluorinated alkyl and aryl groups. Anion complexation causes an increase in the concentration and transference number of cation moieties thereby increasing the rate capability and cathode utilization of an electrochemical cell. Also when the boronate-based compounds of the present invention are used with lithium fluoride, lithium chloride, lithium bromide or lithium iodide, a salting-in effect takes place which increases the solubility of these salts. "Salting in" refers to the mutual increase in the solubilities of an electrolyte and an organic compound added to the same solvent. As a result of anion complexation properties, the fluorinated boron-and boronate-based compounds of the present invention can be used as electrolyte additives in both primary and secondary lithium and lithium ion batteries.

Figure 2:
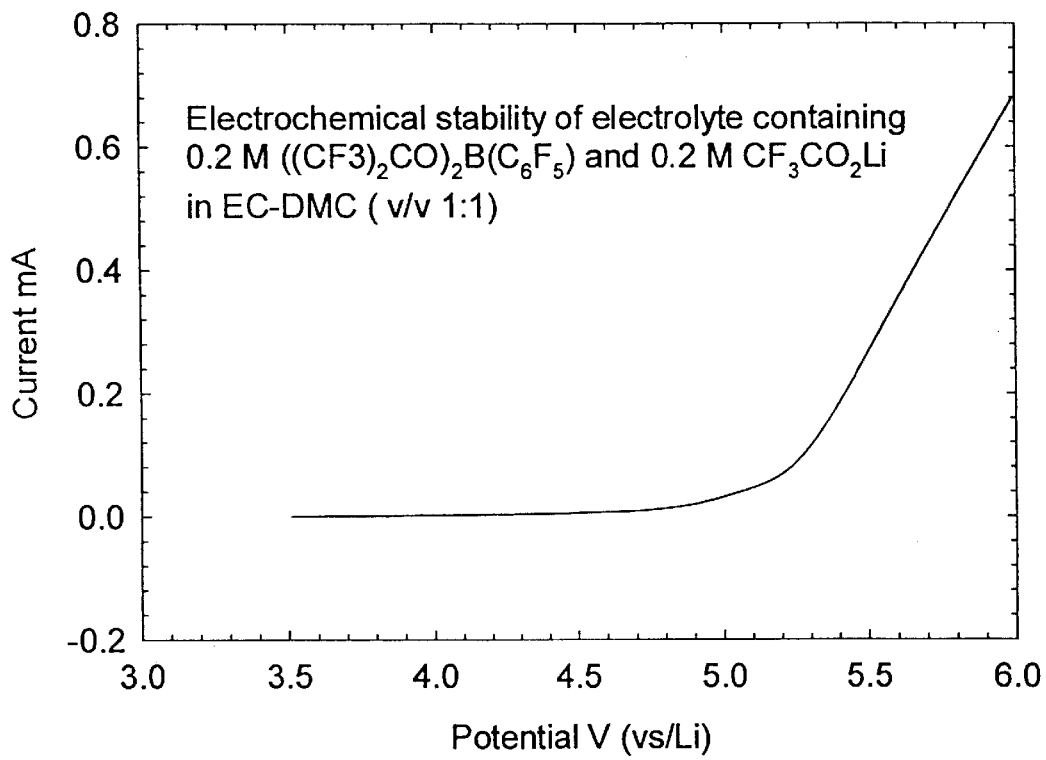
FIG. 2 is a graph which shows the electrochemical stability of one of the phenyl boronate based compounds of the present invention.

FIG. 2 illustrates the electrochemical stability of $(C_6F_{12})O_2B(C_6F_5)$, one of the boron-based compounds of the present invention (FIG. 1, compound 11), when used as an additive with LiF salt in EC/DMC solution. The curve shows that this electrolyte is electrochemically stable up to 5.0 V vs Li. Moreover, the electrochemical stability of the electrolyte at voltages as high as 5 V is significantly higher than most of the non-aqueous electrolytes that are now in use.

In a primary cell of the present invention, other cell components include an anode composed of lithium, lithium alloys, lithium carbon intercalation compounds, lithium graphite intercalation compounds, lithium metal oxide intercalation compounds, and mixtures thereof.

A cathode is also a component of the primary cell of the present invention. The cathode is composed of a transition metal oxide, a transition metal chalcogenide, a poly (carbon disulfide) polymer, an organo-disulfide redox polymer, a polyaniline, an organodisulfide/polyaniline composite and an oxychloride. Examples include $SO_2$, $CuO$, $CuS$, $Ag_2CrO_4$, $I_2$, $PbI_2$, $PbS$, $SOCl_2$, $V_2O_5$, $MoO_3$ or $MnO_2$ or poly(carbon monofluoride), $(CF)_n$. Organic solvents, such as acetonitrile and propylene carbonate and inorganic solvents, such as thionyl chloride are typical. A compatible solute such as $CF_3COOLi$, $C_2F_5COOLi$, $LiI$, $LiBr$, $LiCl$, $LiF$, $LiClO_4$, $LiAsF_6$, $LiBF_4$, $LiPF_6$, $LiSbF_6$ or mixtures thereof is added to provide the necessary electrolyte conductivity.

The boron- and boronate-based compounds of the present invention are also effective electrolyte additives for secondary or rechargeable batteries. The secondary electrochemical cell containing the electrolyte additive of the present invention includes a lithium metal anode or an anode containing a material capable of reversibly incorporating a lithium metal, a cathode capable of reversibly incorporating a lithium metal, a lithium metal incorporated in at least one of said anode and cathode and an electrolyte. The electrolyte includes an organic solvent, a lithium salt and an electrolyte additive which is an anion complexing agent and can complex with the anion moiety of the electrolyte salt.

The anode material useful for the rechargeable battery of the present invention includes lithium, lithium alloys, such as Li—Al, Li—Si, Li—Cd, lithium-carbon or lithium-graphite intercalation compounds, lithium metal oxide intercalation compounds such as $Li_xWO_2$ or $LiMoO_2$ or a sulfide such as $LiTiS_2$.

Suitable cathode materials include transition metal oxides, metal halides or chalcogenides which intercalate lithium. Examples of oxides and chalcogenides useful in the present invention include: $Li_{2.5}V_6O_{13}$, $Li_{1.2}V_2O_5$, $LiCoO_2$, $LiNiO_2$, $LiNi_{1-x}M_xO_2$ (where M is Co, Mg, Al, or Ti), $LiMn_2O_4$, $LiMnO_2$, $Li_3NbSe_3$, $LiTiS_2$, $LiMoS_2$. Organo disulfide redox polymers are based on the reversible electrochemical dimerization/scission or polymerization/depolymerization of organo disulfide polymers by the reaction:

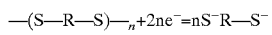

where R is an aliphatic or aromatic moiety and n>50. An example is 2,5 dimercapto-1,3,4-thiadiazole.

In assembling the cells of the present invention, the cathode is typically fabricated by depositing a slurry of the cathode material, the electrically conductive inert material, the binder and a fugitive liquid carrier such as cyclohexane, on the cathode current collector, and then evaporating the carrier to leave a coherent mass in electrical contact with the current collector.

In assembling the cell of the present invention, the anode can similarly be fabricated by depositing a slurry of the highly graphitic carbonaceous anode material, the electrically-conductive inert material, the binder and a fugitive liquid carrier such as hexane on the electrically-conductive anode support and then evaporating the carrier to leave a coherent mass in electrical contact with the support.

The cathode assembly is then combined with the anode assembly with the porous polymeric electrode separator sandwiched therebetween. The preferred way of constructing high voltage rechargeable cells is to make them by using the cathode material in the discharged state which cathode material is lithiated metal oxides, materials stable in air. The layered assembly is then wound around the metallic center post to form a spiral assembly which is then placed into the cell container to which is added the electrolyte solution into which the additive of the present invention has been dissolved. The cell container is then covered with a cell cap.

The electrolyte solution includes a lithium salt dissolved in the electrolyte solvent. The electrolyte salt should be compatible with both the cathode-active material, the anode material and the fluorinated alkyl, the aryl boron-based, and the fluorinated phenyl boronate based compounds bearing different fluorinated alkyl and aryl groups of the present invention. Suitable lithium electrolyte salts include $CF_3COOLi$, $C_2F_5COOLi$, LiBr, LiCl, LiI, LiF and mixtures thereof.

Suitable electrolyte solvents include non-aqueous, liquid polar solvents such as ethylene carbonate, dimethyl carbonate and mixtures thereof. Other useful solvents are ethers, organic carbonates, lactones, formates, esters, sulfones, nitrites and oxazolidinones. Useful electrolyte solvents include tetrahydrofuran; 2-methyl tetrahydrofuran; 4-methyl-1,3-dioxolane; 1,3-dioxolane; 1,2-dimethoxyethane; dimethoxymethane; ethylene carbonate; propylene carbonate; γ-butyrolactone; methyl formate; sulfolane; acetonitrile; 3-methyl-2-oxazolidinone, N-methyl-2-pyrrolidinone and mixtures thereof.

Polymer electrolytes of several types are also useful for electrochemical cells of the present invention. One type consists of lithium salts dissolved in linear polyethers such as poly(ethylene oxide). Because it is important that the polymer be amorphous and have a low glass transition temperature, the polymer electrolytes may be designed as polymer networks, branched or comb shaped polymers which have flexible inorganic backbones such as $(-P=N-)_n$ or $(-SiO-)_n$. A polymer electrolyte may be further modified by addition of plasticizers such as organic carbonates.

Gelled electrolytes are another type of electrolytes that are useful for the electrochemical cells of the present invention. Gelled electrolytes include a solution of lithium salt in a liquid organic solvent and a supporting matrix of a polymer such as poly(acrylo nitrile) (PAN) or poly(vinylidene fluoride-hexafluoro propylene (P(VDF-HFP)) copolymer. Examples of lithium salts which can be used in gelled electrolytes are LiF, LiCl, LiBr, LiI, $CF_3COOLi$ and $C_2F_5COOLi$. Binary solvents such as mixture of ethylene carbonate and propylene carbonate can also be used as liquid solvents in gelled electrolytes.

In a secondary electrochemical cell, the fluorinated boron- and boronate-based compounds of the present invention complex the anion moieties found in the electrolyte thereby increasing the availability of the free cations. For example, in a lithium or lithium ion battery, upon leaving the anode, the lithium cation is shuttled across the electrolyte for incorporation into the host lattice of the cathode. Thus, by complexing the anion moiety, more positively charged lithium ions become available for transfer thereby increasing dramatically the ionic conductivity of the battery cell.

For example, LiF is almost insoluble in 1,2-dimethoxyethane; however, after adding a molar equivalent of one of the fluorinated boronate compounds of the present invention $((CF_3)_2C)_2O_2B(C_6F_5)$ (compound 11 in FIG. 1), 1M of LiF solution in DME was obtained and a conductivity as high as $6.55 \times 10^{-3} Scm^{-1}$ was achieved.

The examples set forth below describe novel syntheses for the fluorinated boron-based compounds of the present invention. The family of newly developed fluorinated boronate compounds form complexes with $Cl^-$ anions and increase the ionic conductivity by increasing the concentration of free $Li^+$ cations, when used as additives in lithium salt/DME electrolytes. The degree of complexation and conductivity also depended on the structure of the boron- or boronate-based compounds.

EXAMPLES

The examples set forth below also serve to provide further appreciation of the invention but are not meant in any way to restrict the scope of the invention. The starting materials for the experiments were purchased from Synquest or Aldrich Chemical Co. For many of the examples, the synthesis process was performed under argon atmosphere or under vacuum. Nuclear Magnetic Resonance (hereinafter "NMR") spectra were recorded on a Hitachi R-1200 (60 MHZ) NMR spectrometer. Fourier Transform Infrared (hereinafter "FTIR") spectra were recorded on a Mattson Infinity Series spectrometer.

Example 1

Preparation of fluorinated 1,3,2-benzodioxaborole compounds (1), (2), and (3)

This example provides a general procedure for the preparation of fluorinated or fluorinated alkyl substituted 1,3,2-benzodioxaborole compounds. The structures of these compounds are shown in FIG. 1 as compounds (1), (2), and (3).

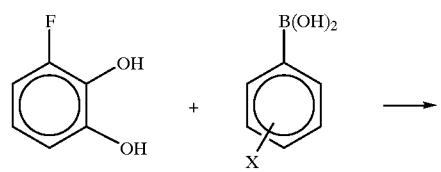

-continued

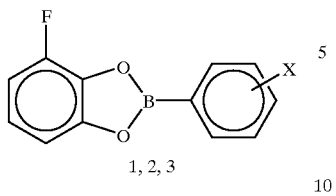

1, 2, 3

1 X = 2,4-difluoro
2 X = 3-trifluoromethyl
3 X = 2,5-ditrifluoromethyl

Compound (1): 2-(2.4-Difluorophenyl)-4-fluoro-1,3,2-benzodioxaborole or $(C_6H_3F)O_2B(C_6H_3F_2)$ (1)

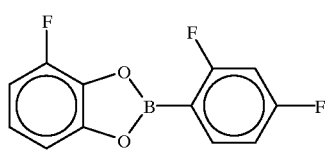

3-fluorocatechol (3.84 g, 0.03 mol) and 2,4-difluoroboronic acid (4.73 g, 0.03 mol) were mixed in 40 ml of toluene. The mixture was heated to reflux and water from the condensation reaction was removed by Dean-Stark trap. After 4 hrs of reaction, the solvent was evaporated from reaction mixture under reduced pressure. The residue was sublimed at 98–100° C./0.1 mm-Hg. The final product, 7.2 g of white crystal powder, was obtained in 96% yield and had the following propertis: melting point: 112° C.; NMR (CDCl$_3$ ppm) δ: 6.7–7.2 (m, 5H), 7.8–8.3 (m, 1H). IR (neat cm$^{-1}$), ν 3082.7, 1613.0, 1499.4, 1462.4, 1422.6, 1393.3, 1368.5, 1331.9, 1268.9, 1173.6, 1140.3, 1103.5, 1057.7, 1025.0, 968.7, 853.3, 774.7, 725.5, 653.4.

Compound (2): 2-(3-Trifluoromethyl phenyl)-4-fluoro-1,3,2-benzodioxaborole (2) or $(C_6H_3F)O_2B(C_7H_4F_3)$ (2)

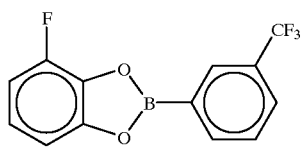

The same synthesis procedure as for compound (1) was used. 3-fluorocatechol reacted with equivalent 3-trifluoromethylboronic acid to yield 95% pure product having the following properties: melting point: 81–82° C.; NMR (CDCl$_3$ ppm) δ 6.8–7.4 (m, 3H), 7.5–8.1 (m, 2H), 8.2–8.5 (m, 2H). IR (neat cm$^{-1}$), ν 3059.5, 1632.7, 1499.7, 1462.5, 1376.1, 1301.9, 1171.3, 1131.0, 1080.0, 1026.9, 917.7, 847.7, 808.7, 774.7, 721.7, 701.1, 605.7.

Compound (3): 2,5-Bis(trifluoromethyl phenyl)-4-fluoro-1,3,2-benzodioxaborole (3) or $(C_6H_3F)O_2B(C_8H_3F_6)$ (3)

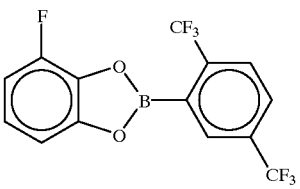

The same synthesis procedure as for compound (1) was used and a crystal powder was obtained in 92% yield and a melting point of about 82° C.

Example 2

Preparation of fluorinated 1,3,2-benzodioxaborole compounds.

The structures of these compounds are shown in FIG. 1 as compounds (4) to (8)

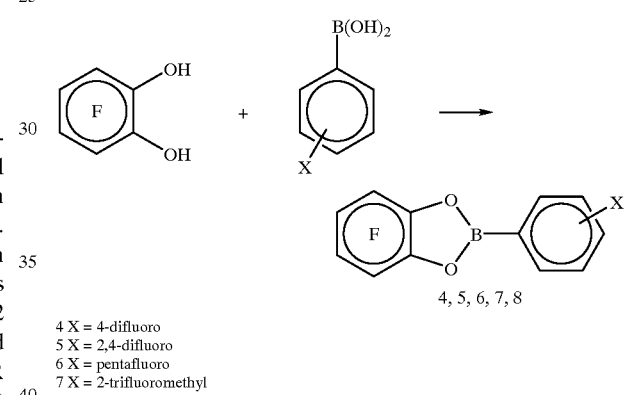

4 X = 4-difluoro
5 X = 2,4-difluoro
6 X = pentafluoro
7 X = 2-trifluoromethyl
8 X = 2,5-ditrifluoromethyl The following compounds (4) to (8) were prepared using the same procedure that was used for compound (1) in Example 1:

Compound (4): 2-(4-Fluorophenyl)-tetrafluoro-1,3,2-benzodioxaborole or $(C_6F_4)O_2B(C_6H_4F)$ (4)

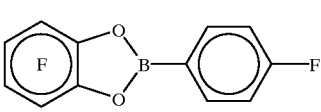

Compound (5): 2-(2,4-Difluorophenyl)-tetrafluoro-1,3,2-benzodioxaborole (5) or $(C_6F_4)O_2B(C_6H_3F_2)$ (5)

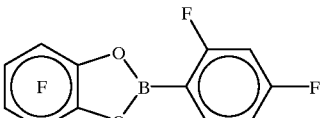

Compound (6): 2-(Pentafluorophenyl)-tetrafluoro-1,3,2-benzodioxaborole (6) or $(C_6F_4)O_2B(C_6F_5)$

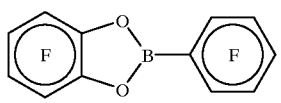
(6)

Compound (7): 2-(2-Trifluoromethyl phenyl)-tetrafluoro-1,3,2-benzodioxaborole (7) or $(C_6F_4)O_2B(C_7H_4F_3)$

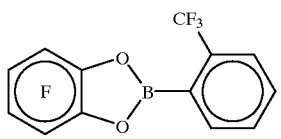
(7)

Compound (8): 2,5-Bis(trifluoromethyl phenyl)-tetrafluoro-1,3,2-benzodioxaborole (8) $(C_6F_4)O_2B(C_8H_3F_6)$

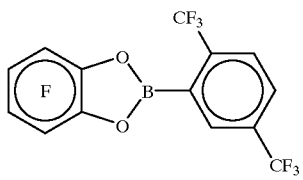
(8)

Compound (9): 2-phenyl-4,4,5,5-tetrakis(trisfluoromethyl)-1,3,2-dioxaborolane or $(C_6F_{12})O_2B(C_6H_5)$

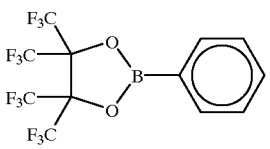
(9)

The synthesis of this compound was followed to the procedure disclosed by M. Allan, A. F. Janzen and C. J. Willis in Can. J. Chem., 46, pp. 3671 (1968). By reacting perfluoropinacol with dichlorophenylborane, the product was obtained in 78% yield, with a boiling point of 68° C./18 mm-Hg.

Compound (10): 2-(3,5-Difluorophenyl-4,4,5,5-tetrakis (trisfluoromethyl)-1,3,2-dioxaborolane or $(C_6F_{12})O_2B(C_6H_3F_2)$

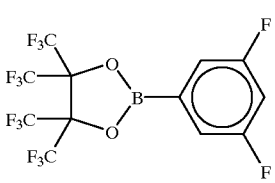
(10)

1-bromo-3,5-difluorobenzene (38.6 g, 0.2 mol) was added slowly to a mixture of magnesium turnings (4.8 g, 0.2 mol) in 200 ml anhydrous ethyl ether. After the reaction mixture was refluxed for 2 hrs, trimethyltin chloride (40 g, 0.2 mol) was dropped in to the solution and kept refluxing for one more hour. Then the reaction mixture was hydrolyzed by saturated ammonium chloride. The organic layer of 3,5-difluorophenyltrimethyltin was separated and purified by distillation in a 62% yield. Then the 3,5-difluorophenyltrimethyltin (11 g, 0.04 mol) was reacted with boron trichloride (11 g, 0.093 mol) in a sealed tube at 0° C. for 1 hr and at room temperature for 12 hrs. Dichloro-3,5-difluorophenylborane (6.3 g, 0.032 mol) was obtained from the reaction in 81% yield. Dichloro-3,5-difluorophenylborane (5.84 g, 0.03 mol) was added into a solution containing perfluoropinacol (10 g, 0.03 mol) in 50 ml anhydrous chloroform at −40° C. Then the reaction mixture was stirred continuously at room temperature for 4 hrs. Then the insoluble material was filtered off from the solution. The chloroform solvent was removed by evaporation. The pure product compound 4 (10 g, 0.022 mol) was obtained by distillation of the residue in 73% yield. Boiling point: 80° C./14 mm-Hg. NMR (CDCl$_3$ ppm) δ: 6.9–7.4 (m, 1H), 7.35–7.7 (m, 2H). IR (neat cm$^{-1}$), v 3092.0, 1593.8, 1480.6, 1432.0, 1388.2, 1248.9, 1109.8, 1080.5, 986.9, 952.8, 889.6, 870.4, 748.2, 721.8.

Compound (11): 2-pentafluorophenyl-4,4,5,5-tetrakis (trisfluoromethyl)- 1,3,2-dioxaborolane or $(C_6F_{12})O_2B(C_6F_5)$

Example 3

Preparation of Fluorinated 1,3,2-Dioxaborolane Compounds (9), (10), (11)

This example provides a general procedure for the preparation fluorinated 1,3,2-dioxaborolane, compounds. The structures of these compounds are shown in FIG. 1 as compounds (9), (10), and (11).

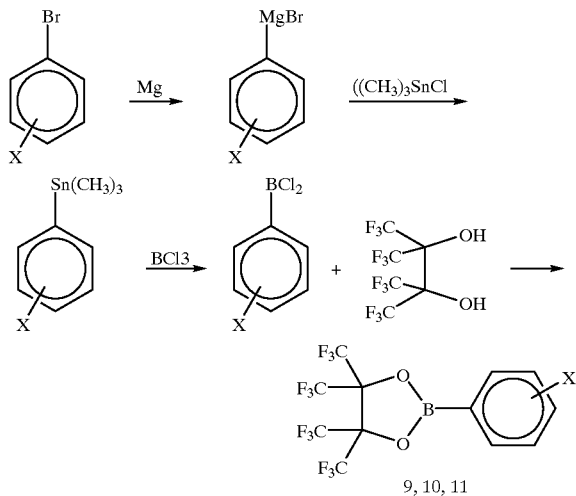

9 X = 5H
10 X = 3,5-difluoro
11 X = pentafluoro (11)

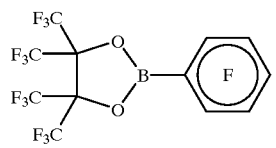

This compound was synthesized with the same procedure for compound (10). Bromopentafluorobenzene and perfluoropinacol were used as starting materials. The final product had a boiling point: 87–90° C./12 mm-Hg. IR (neat cm$^{-1}$), v 1657.6, 1493.5, 1426.4, 1368.4, 1246.5, 1083.7, 989.9, 952.2, 889.0, 749.2, 718.2.

Example 4

Conductivity Studies

In this example, the ionic conductivity of electrolyte solutions containing lithium salts and various boron-based compounds of the present invention was measured and compared with the conductivity of electrolyte solutions without additives. Eleven boron-based compounds of the present invention were added to three lithium salt/DME solutions over a range of concentrations and the conductivities of the solutions were then measured. The three lithium salts used in these examples were LiCF$_3$COOLi, LiC$_2$F$_5$COOLi and LiF.

The solutions were prepared by adding equal concentrations of a boron-based compound and a lithium salt with DME to form a solution. DME solutions were prepared for concentrations of from 0.2 M to 1.2 M. The ionic conductivity of the solutions was then measured and the results are shown in Tables I to XI. The conductivity of a DME solution containing 0.2M of each of the lithium salts without a boron-based compound additive was also measured and compared to the conductivities of the examples. The conductivities for the DME solutions containing 0.2M LiCF$_3$COOLi and 0.2M LiC$_2$F$_5$COOLi salt, are 3.3×10$^{-5}$ S/cm and 2.1×10$^{-5}$ S/cm respectively. LiF salt was not soluble in the DME solution without an additive and, therefore, the conductivity was not measured.

The concentration of the lithium salt was chosen to be the same as the concentration of the additive in each solution because it was found that the solubility of the salts is related to the concentration of the additives, especially for LiF. Conductivity measurements were made at 25° C. using a Hewlett-Packard 4129A Impedance Analyzer in the frequency range from 5 Hz to 10 MHZ. Cells with platinum electrodes were used for the measurements. The cell constants were calibrated by measuring a 0.05N KCl standard aqueous solution.

TABLE 1

Ionic Conductivity of Compound (1) + Lithium Salt in DME solutions

| Concentration of Compound (1) | Concentration of Lithium Salt | Conductivity CF$_3$COOLi (S/cm) | Conductivity C$_2$F$_5$COOLi (S/cm) | Conductivity LIF (S/cm) |
|---|---|---|---|---|
| 0 | 0.2 M | 3.3 × 10$^{-5}$ | 2.1 × 10$^{-5}$ | * |
| 0.2 M | 0.2 M | 1.24 × 10$^{-3}$ | 1.1 × 10$^{-3}$ | * |
| 0.4 M | 0.4 M | 2.83 × 10$^{-3}$ | 2.73 × 10$^{-3}$ | * |
| 0.6 M | 0.6 M | 3.83 × 10$^{-3}$ | 3.69 × 10$^{-3}$ | * |

TABLE 1-continued

Ionic Conductivity of Compound (1) + Lithium Salt in DME solutions

| Concentration of Compound (1) | Concentration of Lithium Salt | Conductivity CF$_3$COOLi (S/cm) | Conductivity C$_2$F$_5$COOLi (S/cm) | Conductivity LIF (S/cm) |
|---|---|---|---|---|
| 0.8 M | 0.8 M | 4.20 × 10$^{-3}$ | 4.07 × 10$^{-3}$ | * |
| 1.0 M | 1.0 M | 3.96 × 10$^{-3}$ | 3.86 × 10$^{-3}$ | * |
| 1.2 M | 1.2 M | 3.40 × 10$^{-3}$ | 3.35 × 10$^{-3}$ | * |

*The solubility of LiF was very low and, therefore, the conductivity was not measured.

TABLE II

Ionic Conductivity of Compound (2) + Lithium Salt in DME solutions

| Concentration of Compound (2) | Concentration of Lithium Salt | Conductivity CF$_3$COOLi (S/cm) | Conductivity C$_2$F$_5$COOLi (S/cm) | Conductivity LIF (S/cm) |
|---|---|---|---|---|
| 0 | 0.2 M | 3.3 × 10$^{-5}$ | 2.1 × 10$^{-5}$ | * |
| 0.2 M | 0.2 M | 1.93 × 10$^{-3}$ | 7.60 × 10$^{-4}$ | * |
| 0.4 M | 0.4 M | 3.57 × 10$^{-3}$ | 1.94 × 10$^{-3}$ | * |
| 0.6 M | 0.6 M | 4.53 × 10$^{-3}$ | 2.90 × 10$^{-3}$ | * |
| 0.8 M | 0.8 M | 4.59 × 10$^{-3}$ | 3.57 × 10$^{-3}$ | * |
| 1.0 M | 1.0 M | 3.95 × 10$^{-3}$ | 3.79 × 10$^{-3}$ | * |
| 1.2 M | 1.2 M | 3.00 × 10$^{-3}$ | 3.68 × 10$^{-3}$ | * |

*The solubility of LiF was very low and, therefore, the conductivity was not measured.

TABLE III

Ionic Conductivity of Compound (3) + Lithium Salt in DME solutions

| Concentration of Compound (3) | Concentration of Lithium Salt | Conductivity CF$_3$COOLi (S/cm) | Conductivity C$_2$F$_5$COOLi (S/cm) | Conductivity LIF (S/cm) |
|---|---|---|---|---|
| 0 | 0.2 M | 3.3 × 10$^{-5}$ | 2.1 × 10$^{-5}$ | * |
| 0.2 M | 0.2 M | 2.40 × 10$^{-3}$ | 2.79 × 10$^{-3}$ | * |
| 0.4 M | 0.4 M | 4.32 × 10$^{-3}$ | 4.74 × 10$^{-3}$ | * |
| 0.6 M | 0.6 M | 5.00 × 10$^{-3}$ | 5.25 × 10$^{-3}$ | * |
| 0.8 M | 0.8 M | 4.67 × 10$^{-3}$ | 4.57 × 10$^{-3}$ | * |
| 1.0 M | 1.0 M | 3.89 × 10$^{-3}$ | 3.22 × 10$^{-3}$ | * |
| 1.2 M | 1.2 M | 2.70 × 10$^{-3}$ | 1.65 × 10$^{-3}$ | * |

*The solubility of LiF was very low and, therefore, the conductivity was not measured.

TABLE IV

Ionic Conductivity of Compound (4) + Lithium Salt in DME solutions

| Concentration of Compound (4) | Concentration of Lithium Salt | Conductivity CF$_3$COOLi (S/cm) | Conductivity C$_2$F$_5$COOLi (S/cm) | Conductivity LIF (S/cm) |
|---|---|---|---|---|
| 0 | 0.2 M | 3.3 × 10$^{-5}$ | 2.1 × 10$^{-5}$ | # |
| 0.2 M | 0.2 M | 1.24 × 10$^{-3}$ | 1.1 × 10$^{-3}$ | # |
| 0.4 M | 0.4 M | 2.83 × 10$^{-3}$ | 2.73 × 10$^{-3}$ | # |
| 0.6 M | 0.6 M | 3.83 × 10$^{-3}$ | 3.69 × 10$^{-3}$ | 7.89 × 10$^{-4}$ |
| 0.8 M | 0.8 M | 4.20 × 10$^{-3}$ | 4.07 × 10$^{-3}$ | 1.00 × 10$^{-3}$ |
| 1.0 M | 1.0 M | 3.96 × 10$^{-3}$ | 3.86 × 10$^{-3}$ | 1.15 × 10$^{-3}$ |

TABLE IV-continued

Ionic Conductivity of Compound (4) + Lithium Salt in DME solutions

| Concentration of Compound (4) | Concentration of Lithium Salt | Conductivity $CF_3COOLi$ (S/cm) | Conductivity $C_2F_5COOLi$ (S/cm) | Conductivity LiF (S/cm) |
|---|---|---|---|---|
| 1.2 M | 1.2 M | $3.40 \times 10^{-3}$ | $3.35 \times 10^{-3}$ | $1.25 \times 10^{-3}$ |

LiF was only partially dissolved in these solutions and, therefore, the conductivity was not measured.

TABLE V

Ionic Conductivity of Compound (5) + Lithium Salt in DME solutions

| Concentration of Compound (5) | Concentration of Lithium Salt | Conductivity $CF_3COOLi$ (S/cm) | Conductivity $C_2F_5COOLi$ (S/cm) | Conductivity LiF (S/cm) |
|---|---|---|---|---|
| 0 | 0.2 M | $3.3 \times 10^{-5}$ | $2.1 \times 10^{-5}$ | # |
| 0.2 M | 0.2 M | $3.50 \times 10^{-3}$ | $3.92 \times 10^{-3}$ | # |
| 0.4 M | 0.4 M | $6.15 \times 10^{-3}$ | $6.60 \times 10^{-3}$ | # |
| 0.6 M | 0.6 M | $7.47 \times 10^{-3}$ | $7.59 \times 10^{-3}$ | $2.20 \times 10^{-3}$ |
| 0.8 M | 0.8 M | $7.50 \times 10^{-3}$ | $7.09 \times 10^{-3}$ | $2.75 \times 10^{-3}$ |
| 1.0 M | 1.0 M | $6.91 \times 10^{-3}$ | $5.62 \times 10^{-3}$ | $3.03 \times 10^{-3}$ |
| 1.2 M | 1.2 M | $5.25 \times 10^{-3}$ | $4.15 \times 10^{-3}$ | $3.15 \times 10^{-3}$ |

LiF was only partially dissolved in these solutions and, therefore, the conductivity was not measured.

TABLE VI

Ionic Conductivity of Compound (6) + Lithium Salt in DME solutions

| Concentration of Compound (6) | Concentration of Lithium Salt | Conductivity $CF_3COOLi$ (S/cm) | Conductivity $C_2F_5COOLi$ (S/cm) | Conductivity LiF (S/cm) |
|---|---|---|---|---|
| 0 | 0.2 M | $3.3 \times 10^{-5}$ | $2.1 \times 10^{-5}$ | # |
| 0.2 M | 0.2 M | $4.11 \times 10^{-3}$ | $4.52 \times 10^{-3}$ | $3.58 \times 10^{-3}$ |
| 0.4 M | 0.4 M | $7.51 \times 10^{-3}$ | $7.67 \times 10^{-3}$ | $6.85 \times 10^{-3}$ |
| 0.6 M | 0.6 M | $9.00 \times 10^{-3}$ | $8.92 \times 10^{-3}$ | $8.98 \times 10^{-3}$ |
| 0.8 M | 0.8 M | $8.24 \times 10^{-3}$ | $8.10 \times 10^{-3}$ | $9.54 \times 10^{-3}$ |
| 1.0 M | 1.0 M | $7.76 \times 10^{-3}$ | $6.49 \times 10^{-3}$ | $9.00 \times 10^{-3}$ |
| 1.2 M | 1.2 M | $6.62 \times 10^{-3}$ | $4.67 \times 10^{-3}$ | $7.68 \times 10^{-3}$ |

*The solubility of LiF was very low and, therefore, the conductivity was not measured.

TABLE VII

Ionic Conductivity of Compound (7) + Lithium Salt in DME solutions

| Concentration of Compound (7) | Concentration of Lithium Salt | Conductivity $CF_3COOLi$ (S/cm) | Conductivity $C_2F_5COOLi$ (S/cm) | Conductivity LiF (S/cm) |
|---|---|---|---|---|
| 0 | 0.2 M | $3.3 \times 10^{-5}$ | $2.1 \times 10^{-5}$ | # |
| 0.2 M | 0.2 M | $3.19 \times 10^{-3}$ | $3.72 \times 10^{-3}$ | # |
| 0.4 M | 0.4 M | $5.67 \times 10^{-3}$ | $6.10 \times 10^{-3}$ | # |
| 0.6 M | 0.6 M | $6.73 \times 10^{-3}$ | $6.89 \times 10^{-3}$ | # |
| 0.8 M | 0.8 M | $6.56 \times 10^{-3}$ | $6.14 \times 10^{-3}$ | $3.06 \times 10^{-3}$ |
| 1.0 M | 1.0 M | $5.59 \times 10^{-3}$ | $4.49 \times 10^{-3}$ | $2.61 \times 10^{-3}$ |
| 1.2 M | 1.2 M | $4.18 \times 10^{-3}$ | $2.58 \times 10^{-3}$ | $2.78 \times 10^{-3}$ |

LiF was only partially dissolved in these solutions and, therefore, the conductivity was not measured.

TABLE VIII

Ionic Conductivity of Compound (8) + Lithium Salt in DME solutions

| Concentration of Compound (8) | Concentration of Lithium Salt | Conductivity $CF_3COOLi$ (S/cm) | Conductivity $C_2F_5COOLi$ (S/cm) | Conductivity LiF (S/cm) |
|---|---|---|---|---|
| 0 | 0.2 M | $3.3 \times 10^{-5}$ | $2.1 \times 10^{-5}$ | # |
| 0.2 M | 0.2 M | $3.60 \times 10^{-3}$ | $3.92 \times 10^{-3}$ | # |
| 0.4 M | 0.4 M | $6.16 \times 10^{-3}$ | $6.56 \times 10^{-3}$ | # |
| 0.6 M | 0.6 M | $6.95 \times 10^{-3}$ | $7.15 \times 10^{-3}$ | # |
| 0.8 M | 0.8 M | $6.60 \times 10^{-3}$ | $6.00 \times 10^{-3}$ | $3.42 \times 10^{-3}$ |
| 1.0 M | 1.0 M | $5.22 \times 10^{-3}$ | $4.11 \times 10^{-3}$ | $3.78 \times 10^{-3}$ |
| 1.2 M | 1.2 M | $3.47 \times 10^{-3}$ | $2.23 \times 10^{-3}$ | $3.46 \times 10^{-3}$ |

LiF was only partially dissolved in these solutions and, therefore, the conductivity was not measured.

TABLE IX

Ionic Conductivity of Compound (9) + Lithium Salt in DME solutions

| Concentration of Compound (9) | Concentration of Lithium Salt | Conductivity $CF_3COOLi$ (S/cm) | Conductivity $C_2F_5COOLi$ (S/cm) | Conductivity LiF (S/cm) |
|---|---|---|---|---|
| 0 | 0.2 M | $3.3 \times 10^{-5}$ | $2.1 \times 10^{-5}$ | # |
| 0.2 M | 0.2 M | $3.15 \times 10^{-3}$ | $3.46 \times 10^{-3}$ | $7.40 \times 10^{-4}$ |
| 0.4 M | 0.4 M | $4.95 \times 10^{-3}$ | $5.33 \times 10^{-3}$ | $1.38 \times 10^{-3}$ |
| 0.6 M | 0.6 M | $5.89 \times 10^{-3}$ | $6.14 \times 10^{-3}$ | $1.90 \times 10^{-3}$ |
| 0.8 M | 0.8 M | $5.65 \times 10^{-3}$ | $5.79 \times 10^{-3}$ | $2.31 \times 10^{-3}$ |
| 1.0 M | 1.0 M | $4.59 \times 10^{-3}$ | $4.46 \times 10^{-3}$ | $2.47 \times 10^{-3}$ |
| 1.2 M | 1.2 M | $3.02 \times 10^{-3}$ | $2.78 \times 10^{-3}$ | $2.40 \times 10^{-3}$ |

*The solubility of LiF was very low and, therefore, the conductivity was not measured.

TABLE X

Ionic Conductivity of Compound (10) + Lithium Salt in DME solutions

| Concentration of Compound (10) | Concentration of Lithium Salt | Conductivity $CF_3COOLi$ (S/cm) | Conductivity $C_2F_5COOLi$ (S/cm) | Conductivity LiF (S/cm) |
|---|---|---|---|---|
| 0 | 0.2 M | $3.3 \times 10^{-5}$ | $2.1 \times 10^{-5}$ | * |
| 0.2 M | 0.2 M | $3.97 \times 10^{-3}$ | $4.12 \times 10^{-3}$ | $2.78 \times 10^{-3}$ |
| 0.4 M | 0.4 M | $6.86 \times 10^{-3}$ | $6.65 \times 10^{-3}$ | $5.41 \times 10^{-3}$ |
| 0.6 M | 0.6 M | $8.23 \times 10^{-3}$ | $7.59 \times 10^{-3}$ | $6.62 \times 10^{-3}$ |
| 0.8 M | 0.8 M | $7.37 \times 10^{-3}$ | $6.44 \times 10^{-3}$ | $6.97 \times 10^{-3}$ |
| 1.0 M | 1.0 M | $5.40 \times 10^{-3}$ | $4.45 \times 10^{-3}$ | $6.33 \times 10^{-3}$ |
| 1.2 M | 1.2 M | $3.46 \times 10^{-3}$ | $2.31 \times 10^{-3}$ | $5.03 \times 10^{-3}$ |

*The solubility of LiF was very low and, therefore, the conductivity was not measured.

TABLE XI

Ionic Conductivity of Compound (11) + Lithium Salt in DME solutions

| Concentration of Compound (11) | Concentration of Lithium Salt | Conductivity $CF_3COOLi$ (S/cm) | Conductivity $C_2F_5COOLi$ (S/cm) | Conductivity LiF (S/cm) |
|---|---|---|---|---|
| 0 | 0.2 M | $3.3 \times 10^{-5}$ | $2.1 \times 10^{-5}$ | * |
| 0.2 M | 0.2 M | $4.30 \times 10^{-3}$ | $4.57 \times 10^{-3}$ | $3.47 \times 10^{-3}$ |
| 0.4 M | 0.4 M | $7.07 \times 10^{-3}$ | $7.16 \times 10^{-3}$ | $6.13 \times 10^{-3}$ |
| 0.6 M | 0.6 M | $7.83 \times 10^{-3}$ | $7.72 \times 10^{-3}$ | $4.53 \times 10^{-3}$ |
| 0.8 M | 0.8 M | $6.74 \times 10^{-3}$ | $6.27 \times 10^{-3}$ | $7.48 \times 10^{-3}$ |
| 1.0 M | 1.0 M | $4.69 \times 10^{-3}$ | $3.97 \times 10^{-3}$ | $6.55 \times 10^{-3}$ |
| 1.2 M | 1.2 M | $2.86 \times 10^{-3}$ | $1.91 \times 10^{-3}$ | $5.10 \times 10^{-3}$ |

*The solubility of LiF was very low and, therefore, the conductivity was not measured.

For all eleven additives studied, the results in Tables I to XI show that the maximum conductivity was reached at a lithium salt concentration of about 0.6M to 0.8M for $CF_3COOLi$ and $C_2F_5COOLi$. The solubility of LiF in DME was too low when compounds (1), (2), and (3) were used as additives, and thus, the conductivity of these solutions was not measured. For compound (6), Table VI shows that in LiF solutions, a conductivity as high as $9 \times 10^{-3}$ was reached for concentrations of 0.8M and 1.0M.

All of the lithium salt/boron-based compound solutions studied achieved a conductivity of at least $6 \times 10^{-3}$ S/cm for at least one concentration, except for compounds (1), (2) and (3). At a conductivity of $6 \times 10^{-3}$ S/cm, a solution can be used as liquid electrolyte in lithium ion batteries providing other properties such as thermal and electrochemical stability are satisfactory. Therefore, the test results in Tables I through XI show that the boron-based compounds of the present invention increase the solubility of the lithium salts to the levels necessary for use in lithium ion batteries.

Example 5

Electrochemical stability studies

In this example, the electrochemical stability of one of boronate compounds of the present invention was studied. A three-electrode cell with a glassy carbon as working electrode (7.0 $mm^2$), platinum wire as counter electrode and metal lithium foil as reference electrode was used in electrochemical stability measurement. Solution of 0.2M LiF and 0.2M $((CF_3)_2C)_2O_2BC_6F_5$ ( compound (11)) in EC/DMC (1:1 ratio) was measured. Measurement was performed by Solatron SI 1287 Electrochemical Interface in potential dynamic mode at a scan rate of 20 mV/s. The resulting curve is plotted in FIG. 2. The electrolyte made of compound (11), LiF salt and EC/DMC solvent has excellent electrochemical stability at voltage vs Li as high as 5 V.

BIBLIOGRAPHY

The following publications mentioned in the foregoing specification are incorporated herein by reference as if set forth in full for all they disclose:

[1] M. Salomon, *J. Solution Chem.*, 19, 1225 (1990).
[2] M. Morita, H. Hayashida and Y. Matsuda, *J. Electrochem. Soc.*, 134, 2107 (1987).
[3] F. P. Schmidtchen and M. Berger, *Chemical Reviews*, 97, 1609 (1997).
[4] M. C. Lonergan, M. A. Ratner and D. Shriver, *J. Am. Chem. Soc.*, 117, 2344 (1995).
[5] H. S. Lee, X. Q. Yang, J. McBreen, L. S. Chio and Y. Okamoto, *J. Electrochem. Soc.*, 143, 3825 (1996).
[6] X. Q. Yang, J. M. Chen, T. A. Skotheim, Y. Okamoto, J. Kirkland and M. L. denBoer, *Phys. Rev.* B40, 7948 (1989).
[7] X. Q. Yang, H. S. Lee, J. McBreen, Z. S. Xu, T. A. Skotheim, Y. Okamoto and F. Lu, *J. Chem. Phys.* 101 (4), 7416 (1994).

What is claimed is:

1. An anion receptor comprising a boron-based compound of the formula $QO_2BR$ or $(QO)_2BR$ wherein R is a fluorinated phenyl or a fluorinated alkyl substituted phenyl and Q is selected from the group consisting of —$C_6H_3F$—, —$C_6H_2F_2$—, —$C_6HF_3$—, —$C_6F_4$—, —$((CF_3)_2)$—, $C_6F_5$—, and $(CF_3)_2CH$—.

2. The anion receptor of claim 1, wherein R is selected from the group consisting of $C_6H_4F$, $C_6H_3F_2$, $C_6H_2F_3$, $C_6HF_4$, $C_6F_5$, $C_6H_4CF_3$, and $C_6H_3(CF_3)_2$.

3. An anion receptor comprising a boron-based compound of the formula $QO_2BR$ or $(QO)_2BR$ wherein R is a phenyl and Q is selected from the group consisting of —$C_6H_3F$—, —$C_6H_2F_2$—, —$C_6HF_3$—, —$C_6F_4$—, $C_6F_5$—, and $(CF_3)_2CH$—.

4. An electrochemical cell comprising a non-aqueous electrolyte solvent and an electrolyte additive comprising a boron-based anion receptor, wherein said boron-based anion receptor is a compound having the formula $QO_2BR$ or $(QO)_2BR$ wherein R is a phenyl, a fluorinated phenyl, or a fluorinated alkyl substituted phenyl and Q is a fluorine bearing moiety.

5. The electrochemical cell of claim 4, wherein R is selected from the group consisting of $C_6H_5$, $C_6H_4F$, $C_6H_3F_2$, $C_6H_2F_3$, $C_6HF_4$, $C_6F_5$, $C_6H_4CF_3$, and $C_6H_3(CF_3)_2$.

6. The electrochemical cell of claim 4, wherein Q is selected from the group consisting of —$C_6H_3F$—, —$C_6H_2F_2$—, —$C_6HF_3$—, —$C_6F_4$—, —$((CF_3)_2C)_2$—, $C_6F_5$—, and $(CF_3)_2CH$—.

7. The electrochemical cell of claim 5, wherein Q is selected from the group consisting of —$C_6H_3F$—, —$C_6H_2F_2$—, —$C_6HF_3$—, —$C_6F_4$—, —$((CF_3)_2C)_2$—, $C_6F_5$—, and $(CF_3)_2CH$—.

8. The electrochemical cell of claim 4, wherein said non-aqueous electrolyte solvent is selected from the group consisting of tetrahydrofuran, 2-methyl furan, 4-methyldioxolane, 1,3-dioxolane, 1,2-dimethoxyethane, dimethoxymethane, ethylene carbonate, propylene carbonate, γ-butyrolactone, methyl formate, sulfolane, acetonitrile and 3-methyl-2-oxazolidinone, dimethyl carbonate, dimethyl ether, 1-methyl-2-pyrrolidinone and poly(ethylene oxide).

9. The electrochemical cell of claim 7, wherein said non-aqueous electrolyte solvent is selected from the group consisting of tetrahydrofuran, 2-methyl furan, 4-methyldioxolane, 1,3-dioxolane, 1,2-dimethoxyethane, dimethoxymethane, ethylene carbonate, propylene carbonate, γ-butyrolactone, methyl formate, sulfolane, acetonitrile and 3-methyl-2-oxazolidinone, dimethyl carbonate, dimethyl ether, 1-methyl-2-pyrrolidinone and poly(ethylene oxide).

10. The electrochemical cell of claim 4, wherein said non-aqueous electrolyte solvent is a gel electrolyte selected from the group consisting of poly(acrylo nitrile) and poly (vinylidene flouride-hexafluoro propylene).

11. The electrochemical cell of claim 10, further comprising a lithium salt in a liquid organic solvent wherein said lithium salt is selected from the group consisting of LiF, LiCl, LiBr, LiI, $CF_3COOLi$, $C_2F_5COOLi$, $C_6F_5COOLi$ and mixtures thereof.

12. The electrochemical cell of claim 11, wherein said liquid organic solvent is a compound selected from the group consisting of ethylene carbonate, propylene carbonate, dimethyl carbonate, dimethyl ether, γ-butyrolactone, 3-methyl-2-oxazolidinone, 1-methyl-2-pyrrolidinone and mixtures thereof.

13. The electrochemical cell of claim 4, further comprising an electrolyte solute selected from the group consisting of LiF, LiCl, LiBr, LiI, $CF_3COOLi$, $C_2F_5COOLi$, and mixtures thereof.

14. The electrochemical cell of claim 7, further comprising an electrolyte solute selected from the group consisting of LiF, LiCl, LiBr, LiI, $CF_3COOLi$, $C_2F_5COOLi$, and mixtures thereof.

15. The electrochemical cell of claim 4, further comprising an anode selected from the group consisting of lithium, lithium alloys, lithium carbon intercalation compounds, lithium graphite intercalation compounds, lithium metal oxide intercalation compounds, and mixtures thereof.

16. The electrochemical cell of claim 4, further comprising a cathode selected from the group consisting of a transition metal oxide, a transition metal chalcogenide, a poly(carbon disulfide) polymer, an organo-disulfide redox polymer, a polyaniline, an organo-disulfide/polyaniline composite and an oxychloride.

17. The electrochemical cell of claim 16, wherein said transition metal oxide is selected from the group consisting of $Li_{2.5}V_6O_{13}$, $Li_{1.2}V_2O_5$, $LiCoO_2$, $LiNiO_2$, $LiMn_2O_4$, $LiMnO_2$, $LiNi_{1-x}M_xO_2$, (M=Co, Mg, Al, and Ti).

18. The electrochemical cell of claim 16, wherein transition metal chalcogenide is selected from the group consisting of $Li_3NbSe_3$, $LiTiS_2$ and $LiMoS_2$.

19. The electrochemical cell of claim 16, wherein organo-disulfide redox polymers are formed by reversible electrochemical dimerization/scission or polymerization/depolymerization of organo disulfide polymers by the reaction:

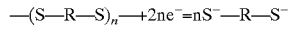

wherein R is an aliphatic or aromatic entity and n>50.

20. The electrochemical cell of claim 16, wherein said organo-disulfide/polyaniline composite is a mixture of polyaniline and 2,5 dimercapto-1,3,4-thiadiazole.

21. A method of enhancing the conductivity of a non-aqueous battery electrolyte comprising adding to said electrolyte a conductivity enhancing amount of a fluorinated boron-based anion receptor having the formula $QO_2BR$ or $(QO)_2BR$.

22. The method of claim 21, wherein said anion receptor is selected from the group consisting of $(C_6H_3F)O_2B(C_6H_3F_2)$, $(C_6H_3F)O_2B(C_7H_4F_3)$, $(C_6H_3F)O_2B(C_8H_3F_6)$, $(C_6F_4)O_2B(C_6H_4F)$, $(C_6F_4)O_2B(C_6H_3F_2)$, $(C_6F_4)O_2B(C_6F_5)$, $(C_6F_4)O_2B(C_7H_4F_3)$, $(C_6F_4)O_2B(C_8H_3F_6)$, $(C_6F_{12})O_2B(C_6H_5)$, $(C_6F_{12})O_2B(C_6H_3F_2)$, $(C_6F_{12})O_2B(C_6F_5)$, $(C_3HF_6O)_2B(C_6H_5)$, $(C_3HF_6O)_2B(C_6H_3F_2)$, $(C_3HF_6O)_2B(C_6F_5)$ and $(C_6F_5O)_2B(C_6F_5)$.

23. The method of claim 21, further comprising adding to said electrolyte an electrolyte solute selected from the group consisting of $LiClO_4$, $LiAsF_6$, $LiBF_4$, $LiPF_6$ and $LiSbF_6$.

24. The method of claim 21, further comprising adding to said electrolyte an electrolyte solute selected from the group consisting of LiF, LiCl, LiBr, LiI, $CF_3COOLi$, $C_2F_5COOLi$, and mixtures thereof.

25. A non-aqueous battery electrolyte comprising:

a solvent;

a lithium salt; and an additive comprising an anion receptor comprising a boron-based compound of the formula

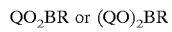

wherein R is a phenyl, a fluorinated phenyl, or a fluorinated alkyl substituted phenyl and Q is a fluorine bearing moiety.

26. The non-aqueous battery electrolyte of claim 25, wherein R is selected from the group consisting of $C_6H_5$, $C_6H_4F$, $C_6H_3F_2$, $C_6H_2F_3$, $C_6HF_4$, $C_6F_5$, $C_6H_4CF_3$, and $C_6H_3(CF_3)_2$.

27. The non-aqueous battery electrolyte of claim 25, wherein Q is selected from the group consisting of —$C_6H_3F$—, —$C_6H_2F_2$—, —$C_6HF_3$—, —$C_6F_4$—, —$((CF_3)_2)_2$—, $C_6F_5$—, and $(CF_3)_2CH$—.

28. The non-aqueous battery electrolyte of claim 26, wherein Q is selected from the group consisting of —$C_6H_3F$—, —$C_6H_2F_2$—, —$C_6HF_3$, —$C_6F_4$—, —$((CF_3)_2C)_2$—, $C_6F_5$—, and $(CF_3)_2CH$—.

29. The non-aqueous battery electrolyte of claim 25, wherein said solvent is selected from the group consisting of tetrahydrofuran, 2-methyl furan, 4-methyldioxolane, 1,3-dioxolane, 1,2-dimethoxyethane, dimethoxymethane, ethylene carbonate, propylene carbonate, sulfolane, γ-butyrolactone, methyl formate, acetonitrile and 3-methyl-2-oxazolidinone, dimethyl carbonate, dimethyl ether, 1-methyl-2-pyrrolidinone and mixtures thereof and poly (ethylene oxide).

30. The non-aqueous battery electrolyte of claim 28, wherein said solvent is selected from the group consisting of tetrahydrofuran, 2-methyl furan, 4-methyldioxolane, 1,3-dioxolane, 1,2-dimethoxyethane, dimethoxymethane, ethylene carbonate, propylene carbonate, γ-butyrolactone, methyl formate, sulfolane, acetonitrile and 3-methyl-2-oxazolidinone, dimethyl carbonate, dimethyl ether, 1-methyl-2-pyrrolidinone and mixtures thereof and poly (ethylene oxide).

31. The non-aqueous battery electrolyte of claim 25, wherein said solvent is a gel electrolyte selected from the group consisting of poly(acrylo nitrile) and poly(vinylidene flouride-hexafluoro propylene).

32. The non-aqueous battery electrolyte of claim 25, wherein said lithium salt is selected from the group consisting of LiF, LiCl, LiBr, LiI, $CF_3COOLi$, $C_2F_5COOLi$, $C_6F_5COOLi$ and mixtures thereof.

33. The non-aqueous battery electrolyte of claim 30, wherein said lithium salt is selected from the group consisting of LiF, LiCl, LiBr, LiI, $CF_3COOLi$, $C_2F_5COOLi$, $C_6F_5COOLi$ and mixtures thereof.

34. A non-aqueous battery electrolyte additive comprising:

an electrolyte solute or a lithium salt; and an anion receptor comprising a boron-based compound of the formula $QO_2BR$ or $(QO)_2BR$ wherein R is a phenyl, a fluorinated phenyl, or a fluorinated alkyl substituted phenyl and Q is a fluorine bearing moiety.

35. The non-aqueous battery electrolyte additive of claim 34, wherein R is selected from the group consisting of $C_6H_5$, $C_6H_4F$, $C_6H_3F_2$, $C_6H_2F3$, $C_6HF_4$, $C_6F_5$, $C_6H_4CF_3$, and $C_6H_3(CF_3)_2$.

36. The non-aqueous battery electrolyte additive of claim 34, wherein Q is selected from the group consisting of $—C_6H_3F—$, $—C_6H_2F_2—$, $—C_6HF_3—$, $—C_6F_4—$, $—((CF_3)_2C)_2—$, $—C_6F_5—$, and $(CF_3)_2CH—$.

37. The non-aqueous battery electrolyte additive of claim 35, wherein Q is selected from the group consisting of $—C_6H_3F—$, $—C_6H_2F_2—$, $—C_6HF_3—$, $—C_6F_4—$, $—((CF_3)_2C)_2—$, $C_6F_5—$, and $(CF_3)_2CH—$.

38. The non-aqueous battery electrolyte additive of claim 34, wherein, said electrolyte solute is selected from the group consisting of $LiClO_4$, $LiAsF_6$, $LiBF_4$, $LiPF_6$ and $LiSbF_6$.

39. The non-aqueous battery electrolyte additive of claim 34, wherein, said lithium salt is selected from the group consisting of LiF, LiCl, LiBr, LiI, $CF_3COOLi$, $C_2F_5COOLi$, and mixtures thereof.

* * * * *